March 3, 1936. E. G. LLOYD 2,032,487
SNOW REMOVING APPARATUS
Filed Dec. 5, 1934

INVENTOR
ERNEST G. LLOYD
BY
ATTORNEY

Patented Mar. 3, 1936

2,032,487

UNITED STATES PATENT OFFICE 2,032,487

SNOW REMOVING APPARATUS

Ernest G. Lloyd, Morton, Pa.

Application December 5, 1934, Serial No. 756,018

3 Claims. (Cl. 37—53)

My invention relates to snow removing apparatus and has for an object thereof to provide improved apparatus of this kind.

A further object of the invention is to provide improved apparatus for the removal of snow, or the like, from surfaces, such as driveways and pavements, which apparatus may be attached to a wheeled implement for support when in operation.

A further object of my invention is to provide a snow removing device which may be attached to a conventional lawn mower for support, when in operation.

These and other objects are effected by my invention, as will be apparent from the following description and claims taken in connection with the accompanying drawing, forming a part of this application, in which:

Figure 1:
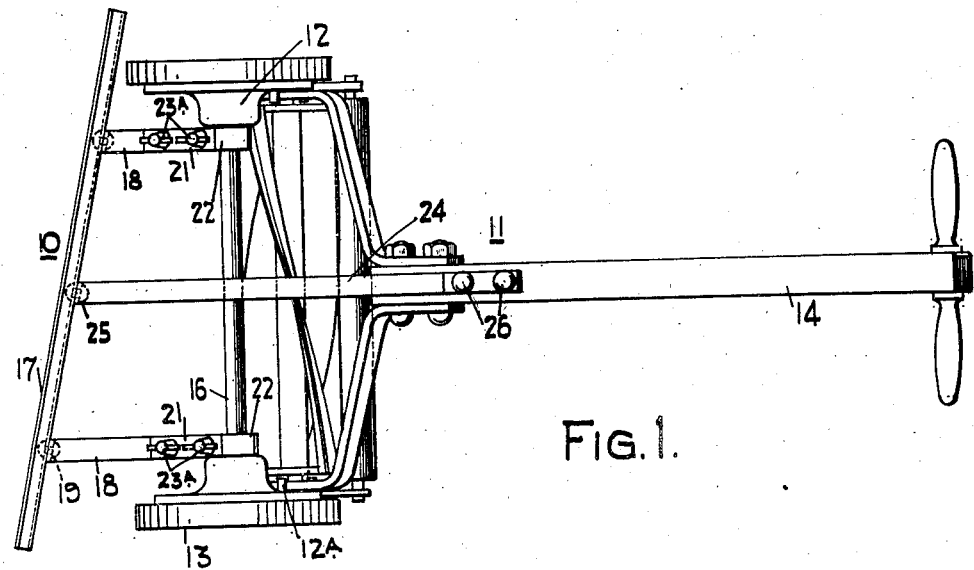
Fig. 1 is a plan view of my improved snow removing apparatus shown attached to a conventional lawn mower.
Figure 3:
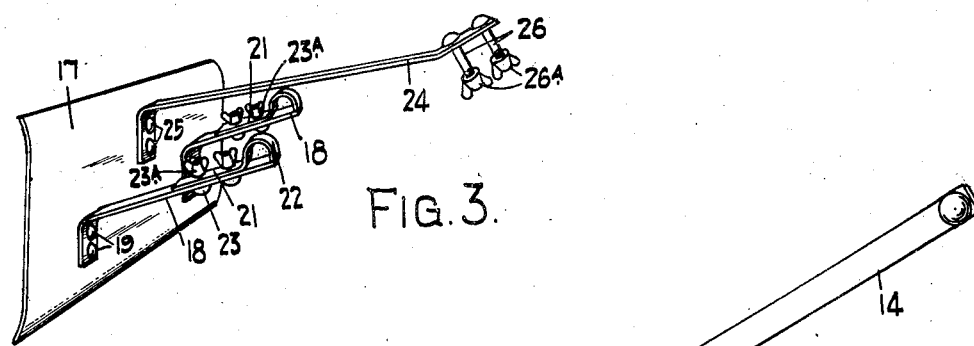

Referring now to the drawing, my novel snow removing device, indicated generally at 10, is disclosed attached to a conventional lawn mower, generally indicated by the numeral 11. The mower includes the usual elements such as, the frame 12, wheels 13, journalled on the frame 12 and supporting th same, and a handle 14, attached at 15 to the frame 12. The handle 14 is angularly adjustable with respect to the frame 12 a limited extent as controlled, for example, by the spacing of the pins 12A. The frame 12 is provided with the usual tie bar 16.

Figure 2:
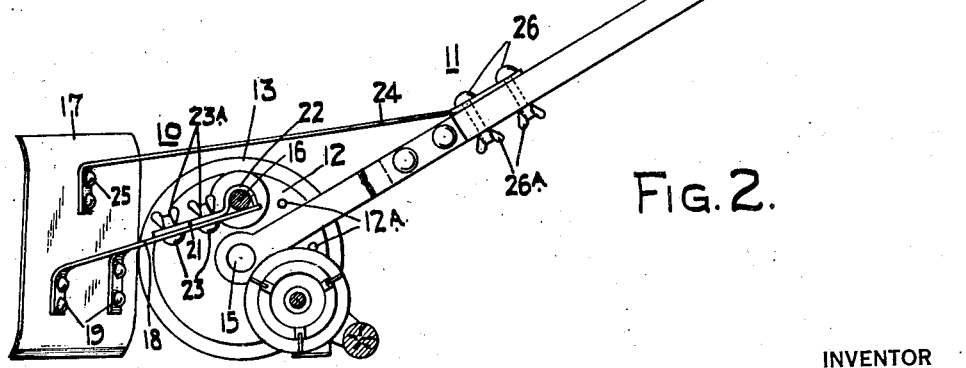
Fig. 2 is a side elevation of the apparatus disclosed in Fig. 1 with parts removed for clearness; and, Fig. 3 is a perspective view of the snow removing apparatus, detached from the mower.

The snow removing device 10 includes a plow member 17, which is spaced forwardly of the mower wheels 13, by means of arms 18. The latter are attached to the plow member 17 by suitable means, such as, for example, the rivets 19. As it is highly desirable to raise and lower the plow 17 during operation by manipulation of the handle 14, an arrangement permitting relative movement between the plow 17 and the frame 12 is provided. This arrangement is preferably obtained by forming the arms 18 so that they engage the tie bar 16 by a pivotal connection. Accordingly, clips 21 having bent portions 22 are secured to the arms 18 by bolts 23. As shown best in Fig. 2, the arms 18 extend beneath the tie bar 16 and the bent portions 22 of the clips 21 are arranged around the bar 16, whereby bearings are formed for the arms 18 on the tie bar 16.

Wing nuts 23A are provided for the bolts 23 so that the clips 21 may be readily attached to, or disengaged from, the arms 18, when the device 10 is being coupled to, or removed from, the mower 11.

Movement of the plow 17 about the tie bar 16 may be effected by a brace 24 secured to the plow 17 by means of rivets 25. The opposite end of the brace 24 is detachably connected to the handle 14 of the mower 11 by means, for example, of bolts 26 and wing nuts 26A, the former passing through the handle 14 and brace 24. The wing nuts 26A are provided for facilitating assembly and disassembly of the handle 14 and brace 24.

Operation of the device 10 is effected by the operator manually walking with and pushing the mower 11 forwardly in the usual manner. As best shown in Fig. 1, the plow 17 is disposed at an angle to the axis of the wheels 13 so that snow is moved laterally to the right as the plow 17 is advanced. The relatively heavy mower 11 resists sideward thrust imparted to it by the plow 17 as it moves through the snow. It is desirable when attaching my novel device to an implement, that one having an appreciable weight be utilized and I have found that a conventional lawn mower forms an ideal carrying member.

During operation, the plow 17 may engage obstacles which protrude upwardly from the surface being cleared. The plow 17 may be raised to pass above the projecting obstacles by depressing the handle 14. This movement is transmitted to the plow 17 by means of the brace 24 and causes the plow 17 to swing upwardly about the bar 16. After passing beyond the projecting obstacles, the handle 14 may be raised to lower the plow 17 to its normal position. The slight changes in angularity between the handle 14, brace 24, and the plow 17, incidental to an upwardly or downwardly adjustment of the plow, is afforded, in the illustrated embodiment of my invention, by the inherent elasticity or flexibility of the attached brace 24 and plow 17. I prefer the disclosed method of connecting the brace 24 to the handle 14 and plow 17 but it will be obvious that other equivalent means may be utilized.

From the foregoing, it will be apparent that I have provided an improved device for the removal of snow from areas to be cleared, which device may be conveniently carried by a conventional mower during operation, which may be readily coupled to and attached from the carrying mower, and which may be adjusted by the mower handle to pass over obstructions, contacted during operation. Furthermore, I have provided a device which may be manufactured and sold at low cost for attachment to a carrying implement which is normally idle during snow removing periods.

While I have shown my invention in but one form, it will be obvious to those skilled in the art that it is not so limited, but is susceptible of various changes and modifications, without departing from the spirit thereof and I desire, therefore, that only such limitations shall be placed thereupon as are imposed by the prior art or as are specifically set forth in the appended claims.

What I claim is:

1. In a snow removing device for attachment to a lawn mower having a rotatable cutter, a bracing member radially spaced from the cutter, a chassis structure including wheels for supporting the cutter and bracing member and a handle member attached to the chassis structure and movable angularly with respect thereto, the combination of a plow, an upper, intermediate supporting member provided on the plow for attaching the latter to the handle member and lower and transversely spaced supporting members provided on the plow for attaching the latter to the bracing member.

2. A snow removing device as claimed in claim 1 wherein the lower supporting members are pivotally attached to the bracing member.

3. A snow removing device as claimed in claim 1 wherein the lower supporting members are pivotally attached to the bracing member and wherein the upper supporting member and plow are flexible.

ERNEST G. LLOYD.